United States Patent [19]

Christopher et al.

[11] Patent Number: 4,486,851
[45] Date of Patent: Dec. 4, 1984

[54] INCREMENTING/DECREMENTING CIRCUIT AS FOR A FIR FILTER

[75] Inventors: Lauren A. Christopher, Weedsport, N.Y.; David L. Sprague, Roosevelt, N.J.

[73] Assignee: RCA Corporation, New York, N.Y.

[21] Appl. No.: 394,320

[22] Filed: Jul. 1, 1982

[51] Int. Cl.³ ............................................. G06F 7/50
[52] U.S. Cl. ................................. 364/770; 377/123; 377/55; 364/786
[58] Field of Search ...................... 364/770, 786, 787; 377/123, 126, 55

[56] References Cited

U.S. PATENT DOCUMENTS

| | | | |
|---|---|---|---|
| 3,100,838 | 8/1963 | Szekely | 364/784 |
| 3,500,062 | 3/1970 | Annis | 307/471 |
| 3,505,511 | 4/1970 | Campano et al. | 364/770 |
| 3,728,532 | 4/1973 | Pryor | 364/787 |
| 3,843,876 | 10/1974 | Fette et al. | 364/786 |
| 3,989,940 | 11/1976 | Kihara | 364/770 |
| 4,075,464 | 2/1978 | Davies, Jr. | 377/55 |
| 4,152,775 | 5/1979 | Schwartz | 364/786 |
| 4,153,939 | 5/1979 | Kudou | 364/770 |
| 4,218,750 | 8/1980 | Carter et al. | 364/770 |
| 4,280,190 | 7/1981 | Smith | 364/770 |
| 4,417,316 | 11/1983 | Best | 364/770 |

OTHER PUBLICATIONS

S. L. Freeny, "Special Purpose Hardware for Digital Filtering", Proc. of IEEE, vol. 63, No. 4, Apr. 1975, pp. 633-648.

*Primary Examiner*—John S. Heyman
*Attorney, Agent, or Firm*—E. M. Whitacre; P. J. Rasmussen; E. P. Herrmann

[57] ABSTRACT

A circuit for incrementing or decrementing a binary number is described. An M bit binary number is applied to M dynamic latch circuits. The latch output signals are applied to M logic units each comprising an exclusive OR, an exclusive NOR and one transistor. The transistors of the respective logic units are connected serially, with the transistor of the logic unit operating on the LSB of the binary number being further connected to a carry in or count signal. The exclusive OR is responsive to the carry in signal and the latched signal to increment/decrement or pass through the respective bit of the binary number. The exclusive NOR is responsive to an Up/Down signal and the latched signal for controlling the conduction state of the respective transistor thereby providing a carry in signal to the input of the next adjacent logic unit operating on the next more significant bit of the binary number.

8 Claims, 6 Drawing Figures

|   | PRESET | $\overline{U}$ | U |
|---|---|---|---|
| C | C4 C3 C2 C1 | C40 C30 C20 C10 | C40 C30 C20 C10 |
| 0 | 0 0 0 0 | 0 0 0 0 | 0 0 0 0 |
| 0 | 0 0 0 1 | 0 0 0 1 | 0 0 0 1 |
| 0 | 0 0 1 0 | 0 0 1 0 | 0 0 1 0 |
| 0 | 0 0 1 1 | 0 0 1 1 | 0 0 1 1 |
| 0 | 0 1 0 0 | 0 1 0 0 | 0 1 0 0 |
| 0 | 0 1 0 1 | 0 1 0 1 | 0 1 0 1 |
| 0 | 0 1 1 0 | 0 1 1 0 | 0 1 1 0 |
| 0 | 0 1 1 1 | 0 1 1 1 | 0 1 1 1 |
| 0 | 1 0 0 0 | 1 0 0 0 | 1 0 0 0 |
| 0 | 1 0 0 1 | 1 0 0 1 | 1 0 0 1 |
| 0 | 1 0 1 0 | 1 0 1 0 | 1 0 1 0 |
| 0 | 1 0 1 1 | 1 0 1 1 | 1 0 1 1 |
| 0 | 1 1 0 0 | 1 1 0 0 | 1 1 0 0 |
| 0 | 1 1 0 1 | 1 1 0 1 | 1 1 0 1 |
| 0 | 1 1 1 0 | 1 1 1 0 | 1 1 1 0 |
| 0 | 1 1 1 1 | 1 1 1 1 | 1 1 1 1 |
| 1 | 0 0 0 0 | 0 0 0 1 | 1 1 1 1 |
| 1 | 0 0 0 1 | 0 0 1 0 | 0 0 0 0 |
| 1 | 0 0 1 0 | 0 0 1 1 | 0 0 0 1 |
| 1 | 0 0 1 1 | 0 1 0 0 | 0 0 1 0 |
| 1 | 0 1 0 0 | 0 1 0 1 | 0 0 1 1 |
| 1 | 0 1 0 1 | 0 1 1 0 | 0 1 0 0 |
| 1 | 0 1 1 0 | 0 1 1 1 | 0 1 0 1 |
| 1 | 0 1 1 1 | 1 0 0 0 | 0 1 1 0 |
| 1 | 1 0 0 0 | 1 0 0 1 | 0 1 1 1 |
| 1 | 1 0 0 1 | 1 0 1 0 | 1 0 0 0 |
| 1 | 1 0 1 0 | 1 0 1 1 | 1 0 0 1 |
| 1 | 1 0 1 1 | 1 1 0 0 | 1 0 1 0 |
| 1 | 1 1 0 0 | 1 1 0 1 | 1 0 1 1 |
| 1 | 1 1 0 1 | 1 1 1 0 | 1 1 0 0 |
| 1 | 1 1 1 0 | 1 1 1 1 | 1 1 0 1 |
| 1 | 1 1 1 1 | 0 0 0 0 | 1 1 1 0 |
|   |   | COUNT UP | COUNT DOWN |

Fig. 3

INCREMENTING/DECREMENTING CIRCUIT AS FOR A FIR FILTER

This invention relates to digital filters and more particularly to a counter circuit for use in counting net ADDER circuit overflows in a finite impulse response, or FIR, non recursive digital filter.

The class of non recursive FIR filters considered is generally specified by the linear constant-coefficient equation $$Y_n = \sum_k a_k x_{n-k}$$

where $(x_n)$ is the input sequence and $y_n$ is the output sequence. The equation implies the addition of a number of terms and FIR filters perform explicitly that function. For instance, the input sequence $x_n$ is appied to a number of coefficient multipliers $a_k$, the products $a_k x_n$ of which are then inputted as addends to ADDER circuits. The augends for the ADDER circuits are partial sums formed from prior additions by the circuitry and stored for one or more periods of the input sequence.

The filter response is tailored simply by changing the number and value of the coefficient multipliers. The accuracy to which the desired response can be achieved is limited substantially only by the resolution of the input sequence and the capacity of the filter hardware elements. It will readily be appreciated that the filter function can be implemented on a general purpose computer, though the computer may not be capable of operating on the input signal in real time. For many applications where it may be desirable to implement the filter function by digital techniques, it may not be practical or possible to incorporate a computer. Thus stand alone or dedicated FIR filters have been developed as circuit device manufacturing techniques advanced to the point where substantial portions of the requisite circuitry could be integrated into cost effective components. The stand-alone filters generally sacrifice computational accuracy in order to achieve real time processing and minimize parts count. This is effected by (a) quantizing the bit length of the signal samples $x_n$ to the minimum commensurate with acceptable signal-to-noise requirements and dynamic range and (b), using ADDERs having a number of bit positions insufficient to output the possible maximum (minimum) partial sums that may occur. When the latter condition occurs the ADDER produces an overflow. Overflows are indicative that the particular sum produced by a particular ADDER is in error and corrective action is required. Heretofore such corrective action has generally taken the form of setting the erroneous sum to one of several alternative predetermined values to tend to reduce the ultimate manifestation of such errors. This correction has commonly been performed at the instant the error is detected.

Consider a digital FIR filter of the input weighted type wherein the input signal $x_n$ is coupled to a plurality of coefficient multipliers, the output products of which are coupled as addends to a like plurality of ADDER circuits. The augends for the respective ADDER circuits are derived from the sums, delayed in time, of others of the plurality of ADDERs arranged in a serial chain (FIG. 1). The present inventors realized that in this configuration, overflows of a particular ADDER may not in fact result in an erroneous filter response. Because the ADDERs can overflow in both the positive and negative direction (two's complement arithmetic) only the net overflow relative to each processed sample when it exits the filter is of importance. Corrective procedures need only be applied with respect to the output sum.

The net number of ADDER circuit overflows can be ascertained for each output sample by coupling the respective ADDER circuit overflow signals to respective up/down COUNTER circuits and transferring the numbers or count in each COUNTER circuit to successive COUNTER circuits in consonance with the partial SUM signals from respective ADDER circuits being transferred to successive ADDER circuits. However in order to realize such a stand alone filter with reasonable hardware, as for example in LSI form, the counter circuitry necessarily must be comprised of simplified circuitry so as to consume a minimum of active circuit area and power.

SUMMARY OF THE INVENTION

The present invention is a clocked logic presettable COUNTER circuit which lends itself to implementation in stand alone FIR filter circuits. The COUNTER circuit utilizes a relatively small parts count making practical fairly complicated FIR filters in integrated form. In addition the COUNTER circuits are expandable in the number of binary count bit positions without incurring substantial counting delay. A further aspect of the COUNTER circuit is the incorporation therein of a dynamic latch which can be operated to perform the intercounter delays necessary to synchronize the successive overflow counts with the delay stages interposed between successive ADDER circuits in the FIR filter.

The COUNTER circuit includes M output terminals M preset input terminals (M being an integer), an up/-down control input terminal and a count signal input terminal. M transistors having respective control electrodes are connected with their principal conduction paths in series between ground or reference potential and a first node. The transistor connected most directly to the reference potential has its control terminal connected to the count signal input terminal. M further transistors having respective control terminals, and principal conduction paths, have their principal conduction paths respectively serially connected between supply potential and interconnections of the first M transistors with the principal conduction path of the Mth further transistor connected between supply potential and the first node. The control electrodes of the M further transistors are energized by a system clock for causing the further transistor to periodically precharge the interconnections to supply potential.

M LATCH circuits controlled by the system clock are connected between the M preset input terminals and M intermediate nodes. M two-input combinatorial logic circuits, having respective output terminals connected to the M COUNTER output terminals, have first input terminals respectively connected to the M intermediate nodes and second input terminals respectively connected to respective interconnections of the first M transistors with the M further transistors. The output function of each of the combinational logic circuits is described by the equation;

$$O_i = \overline{C}_i \oplus B_i$$

where $O_i$ is the logic state of the ith output terminal, $\overline{C_i}$ is the complement of the logic state at the ith COUNTER input terminal, $B_i$ is the logic state at the second input terminal of the ith combinatorial logic circuit and $\oplus$ represents the conventional exclusive OR function.

(M-1) further two-input combinatorial logic circuits have respective first input terminals connected to the intermediate nodes associated with the (M-1) least significant bits (LSB's) of the preset input count. Respective second input terminals of these circuits are connected to the up/down control input terminal and respective output terminals are connected to the control electrodes of the remaining first M transistors. Logic circuits coupled to respective ascending preset input bit positions are connected to ascending ones of the M transistors with the logic circuit coupled to the LSB position being connected to the series transistor connected second closest to reference potential.

The output function $O_i'$ of each of the (M-1) further combinatorial circuits is defined by;

$$O_i' = C_i \oplus U/D$$

where $O_i$ is the output state of the ith circuit, $C_i$ is the state of the ith preset input and U/D is the state of the up/down control electrode.

BRIEF DESCRIPTION OF THE DRAWINGS

FIG. 3 is a state table defining the output states of the FIG. 2 circuit relative to the input states thereof;

DETAILED DESCRIPTION OF THE INVENTION

Figure 1:
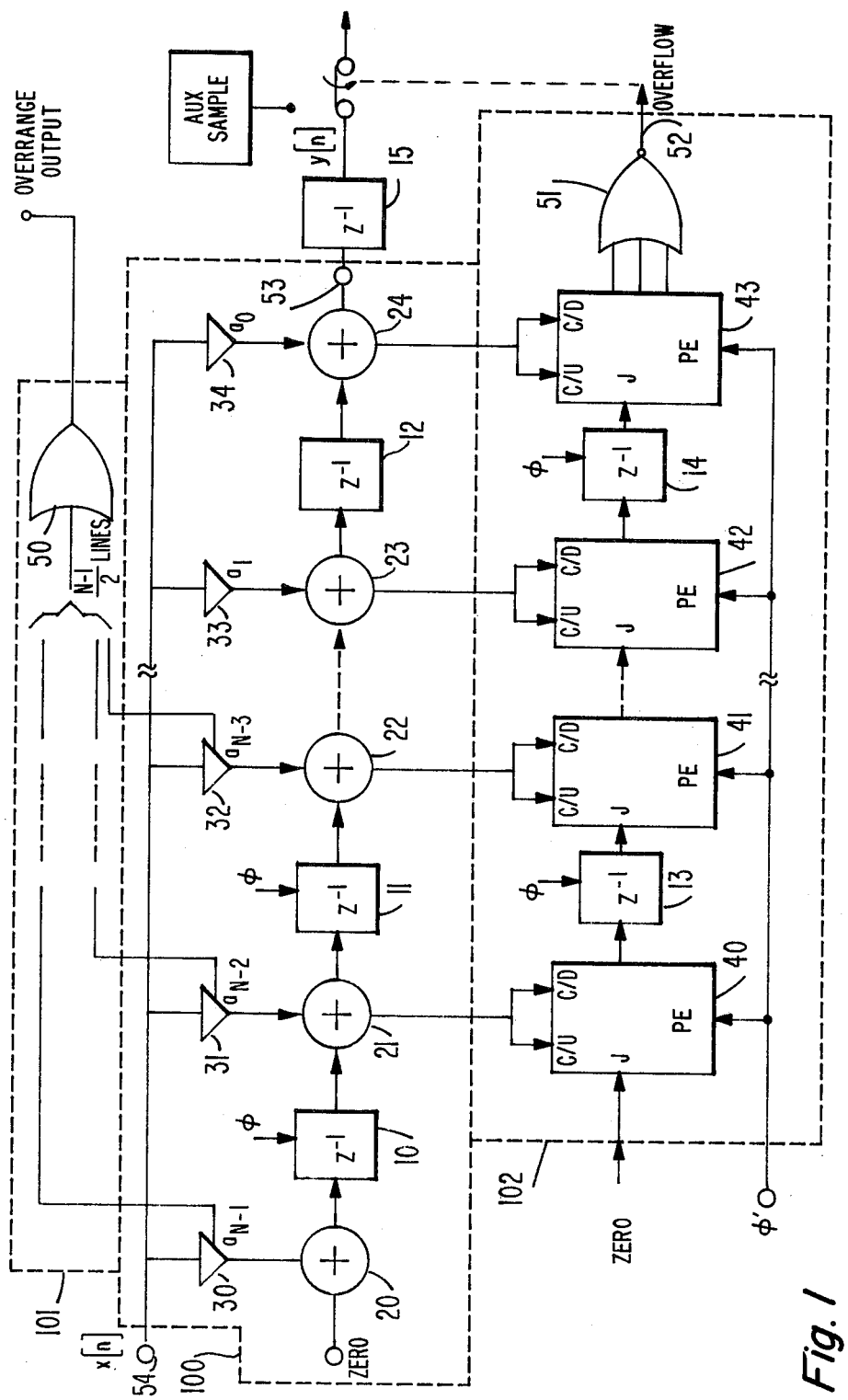
FIG. 1 is a block diagram of an FIR filter including a COUNTER circuit for accumulating the net number of ADDER circuit overflows associated with each processed signal sample.

Referring to FIG. 1 the elements circumscribed by the broken line 100 illustrate generally a conventional non-recursive sampled data FIR filter. Input samples $x_n$ applied to terminal 54 are multiplied by the coefficients $a_i$ in MULTIPLIER circuits 30-34. The samples $a_i x_n$ are applied as addends to respective ADDER circuits 20-24. Output SUMS from the ADDER circuits 20-23 are applied as input samples to delay elements 10-12 respectively and the output SUM of ADDER circuit 24 produces the filter output samples $y_n$. The filter output signal $y_n$ is latched into the LATCH circuit 15 in order to maintain the integrity of the output for a sample period for utilization by further circuitry (not shown). The filter response is defined by the relation $$y_n = \sum_{k=0}^{N-1} a_k x_{n-k} \qquad (1)$$

where N is the number of delay elements employed in the filter.

The coefficient MULTIPLIER circuits are commonly realized by circuitry which performs successive shift and add operations, the number of additions being determined by the coefficient. The product is therefore in reality a sum and may include an "overflow bit", the overflow bit being the sign—exclusive OR—carry out and hereinafter referred to as simply the "carry bit". The occurrence of a "carry bit" indicates that the product surpasses the range of the multiplier. It is advantageous to moniter the "carry bits" of the respective MULTIPLIER circuits for the purpose of automatically adjusting the input range of the signal samples $x_n$ to preclude saturation of the MULTIPLIER. The circuit circumscribed by broken line 101 detects the "carry bits" of respective ones of MULTIPLIER circuits 30-34 and produces an overflow detected signal for the occurrence of a "carry bit" from any one of the respective ones of the MULTIPLIERS.

The input samples $x_n$ are presumed to be in two's complement format as are the products $x_n a_i$ (though a corresponding arrangement may be designed utilizing "sign" + "magnitude" sample format). The ADDER circuits 20-24 perform two's complement arithmetic. The leftmost ADDER circuit 20 which adds zero to the product $x_n a_{N-1}$ is included in the drawing only for generality and may be eliminated in the present filter. In certain applications, however, it may be desirable to include ADDER 20, for example, to equalize sample processing delays.

Each adder is designed to produce a SUM, a "sign" signal, e.g., the MSB of the signal sample, and a "carry out". The "sign" and "carry out" bits (hereinafter the count signal) are applied to COUNTER circuits 40-43 to compute the net positive and negative overflows associated with each sample as is it processed from leftmost ADDER circuit 20 to the output ADDER circuit 24. For purposes of illustration the "sign" and "carry out" bits are converted to count up (C/U) and count down (C/D) signals for application to conventional presettable COUNTER circuits such as the RCA Corp. CD40193 CMOS integrated circuit. The conversion may be accomplished by the circuitry illustrated in FIG. 4 which will be described hereinafter.

Each COUNTER circuit 40-43 has a set of "jam" input terminals, J, from which a predetermined binary number can be preset in the counter responsive to a pulse applied to a preset enable (PE) terminal. The COUNTER circuit will thereafter count up or count down from the preset value responsive to the C/U and C/D signals respectively. Nominally in most applications no more than one count pulse will be available from any one ADDER per sample period. Thus the COUNTER circuit can be designed to simply increment or decrement a preset number by 1 (base 2) responsive to the count signals. Each COUNTER circuit produces a binary output signal equal to the preset value incremented or decremented in accordance with the C/U or C/D signal from the respective adder. Each output count is applied to respective delay elements 13-14 synchronously with the respective sums from ADDERs 21-23 being applied to delay elements 11-12. The delay period associated with each delay element 13-14 is equal in duration to respective ones of the delay elements 11-12 so that respective counts corresponding to particular signal SUMS arrive at successive COUNTER circuits simultaneously with the corresponding signal SUMS arriving at successive ADDER circuits.

The leftmost or first COUNTER circuit 40 is preset with a predetermined count, for example zero. Thus if the number of positive and negative overflows attendant a particular sum, as it is processed through the filter, are equal, the count in the rightmost or last COUNTER circuit 43 corresponding to that particular sum will be zero. The resultant count or binary number present in COUNTER circuit 43 is monitered by NOR gate 51 which produces an output signal only for the count being zero. The output signal from NOR gate 51 may be employed to selectively gate the resultant sum to further processing circuitry. For the condition that the net overflow count is not zero a predetermined fixed SUM may be substituted for the erroneous ADDER 24 output SUM.

For the case where the entire filter is to be realized in integrated form COUNTER circuits of the type normally used in medium scale integrated (MSI) circuits such as the CD40193 are impractically complex and consume excess circuit area by virtue of conservative design. Because the coefficient multipliers 30–34 and the ADDER circuits 20–24 are inherently complex it is a necessity to economize the COUNTER circuits with respect to circuit elements if the complexity of the entire filter circuit is to be manageable.

Figure 2:
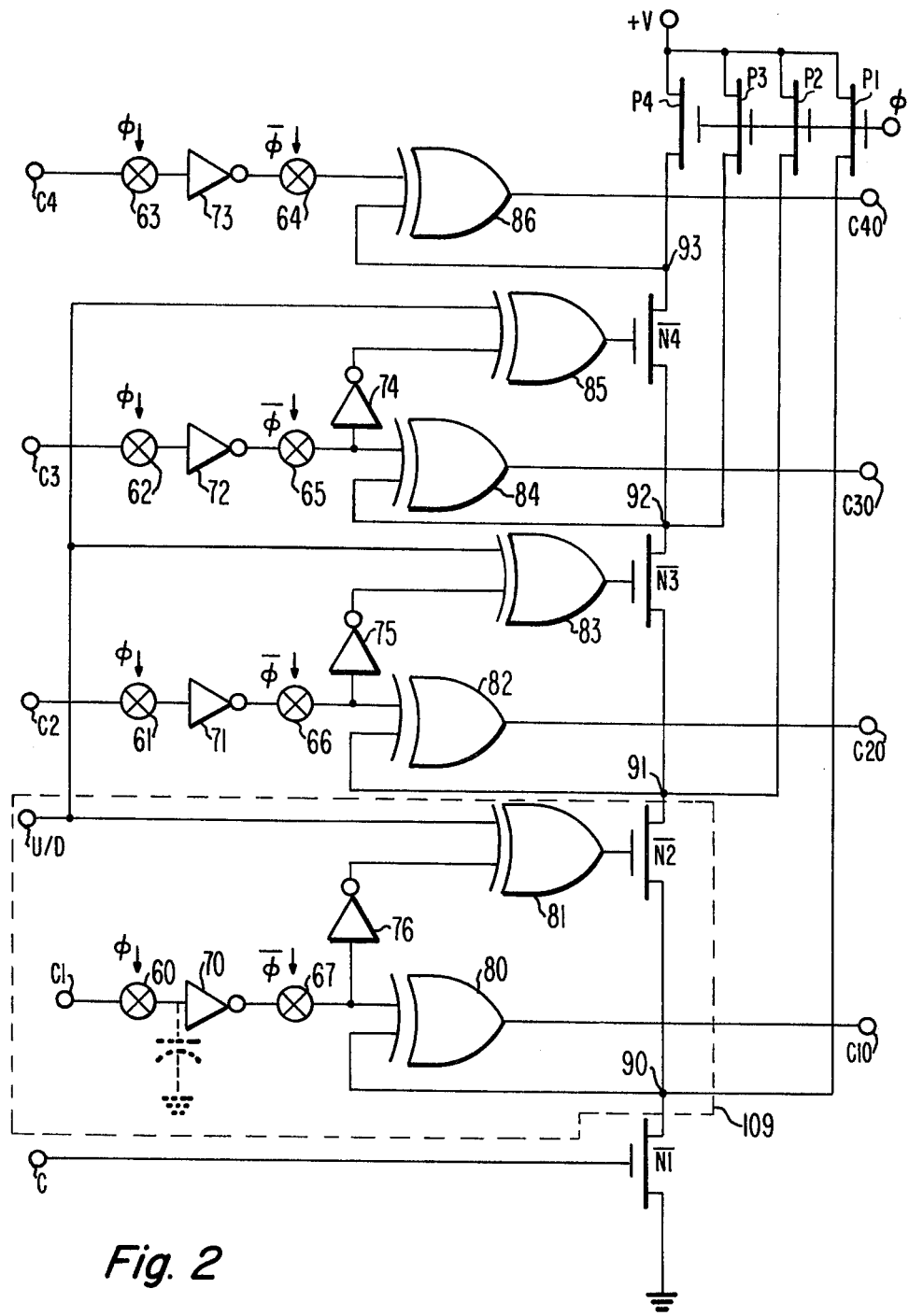
FIG. 2 is a partial block partial schematic diagram of a COUNTER circuit embodying the present invention.

Referring now to FIG. 2, there is shown a COUNTER circuit which may be practically implemented into an FIR filter in integrated form. The FIG. 2 COUNTER responds directly to carry out and sign bit signals and includes circuitry for providing the delay function of circuit elements 13–14 in FIG. 1.

In the FIG. 2 circuit the value of a preset count or number is applied in binary form to terminals C1–C4 with the MSB's applied in descending order to terminals C4, C3, etc. The count or number resident in the COUNTER is available at terminals C10–C40 in binary form with the MSB at terminal C40. The overflow or count signal is applied to terminal C to initiate an increment/decrement to the preset number. The "sign" bit is applied to the terminal designated U/D for determining whether the count should be up or down. A logic low (high) applied to the U/D terminal conditions the circuit to count up (down).

Circuit elements 60–67 are transmission gates which are conditioned to conduct by the respective clock signals $\phi$ or $\bar{\phi}$ applied thereto and are substantially open circuits otherwise. Transmission gates 60–63 conduct alternately with transmission gates 64–67 so that at no time is there a closed conduction path through any of the serially connected pairs of transmission gates (60, 67), (61, 66), etc.

The circuit elements 70–74 are inverting buffers, presumed to have relatively high input impedance as for example CMOS inverters comprising serially connected pairs of P and N-type MOS transistors. Associated with the input terminal of each inverter is a finite inherent stray capacitance; the buffer input impedance and stray capacitance exhibit a time constant which is long relative to the delay between successive input samples $x_n$.

The serially connected transmission gates and buffer circuits (60, 70), (61, 71), etc. form respective dynamic latch circuits. Application of a high clock signal $\phi$ to transmission gates 60–63 conditions them to conduct the binary signals on terminals C1–C4 to the input terminals of the respective buffers 70–73. When clock $\phi$ goes low the binary signals remain stored on the inherent capacitances asociated with the input terminals of the buffers until gates 60–63 are again conditioned to conduct by the next successive $\phi$ clock pulse. Buffers 70–73 produce signals at their respective output terminals which are the complements of the logic levels stored at their respective input terminals. Subsequent to clock $\phi$ going low, clock $\bar{\phi}$ goes high conditioning transmission gates 64–67 to pass the signals present at the output terminals of the buffers 73–70, to the input terminals of buffers 74–76 and one input terminal of respective exclusive OR gates 80, 82, 84 and 86. The exclusive OR gates are also presumed to exhibit relatively high input impedance so that when transmission gates 64–67 are turned off the signal will remain stored on the inherent capacitances associated with the input terminals for a delay period commensurate with the delay provided by the delay elements 10–12 of FIG. 1. It should be noted, however, that for slow sample rates or long delay times it may be necessary to augment the inherent capacitances associated with the buffer and exclusive OR input terminals with auxiliary capacitors to extend the storage time.

The second input terminal of exclusive OR gate 80 is connected to the output terminal 90 of a clocked inverter comprising the serial connection of P-type transistor P1 and N-type transistor N1. Connection 90 is precharged to positive potential via transistor P1 when clock $\phi$ is low. The positive potential is stored on stray capacitances associated with connection 90 unless transistor N1 is conditioned to conduct. Transistor N1 having its gate electrode connected to terminal C conducts whenever the count signal is high. Thus connection 90 remains high if terminal C is low, and goes low when terminal C is high. The output C10 of exclusive OR gate 80 is described by the Boolean equation $$C_{10} = \overline{C_1}C + C_1\overline{C} \qquad (2)$$

where C and C10 are the logic states at terminals C and C10 respectively and C1 is the logic state of the lastmost preset count bit transmitted from terminal C1 to the input of exclusive OR gate 80, via transmission gates 60 and 67. More properly if the current state of terminal C1 is defined $C1_n$ then the current state at the OR 80 and INVERTER 76 common input terminal is $C1_{n-1}$ where the n−1 subscript indicates a one sample delay. However, in order not to generate overly confusing equations with excess subscripts, the state values in the equations will be written C1, C2, etc. and it is implicit that these terms are in fact the states of the previous count bits delayed one clock period ($\phi$). From equation (2) it can be seen that if the count signal is low the preset bit is passed directly to the output terminal. If the count signal is high a "1" is added to the preset number C1.

Exclusive OR gate 82 has its second input terminal connected to the output connection of a clocked quasi NAND structure comprising the serial connection of P-type transistor P2 and N-type transistors N1 and N2. Transistors P2 precharges connection 91 to a high state when the clock $\phi$, applied to its gate electrode is low. Connection 91 remains in the high state unless both transistors N1 and N2 are conditioned to conduct. As indicated above transistor N1 is responsive to the count signal. Transistor N2, on the other hand, is conditioned to conduct depending upon the states of the "sign" bit (up/down control signal) and the least significant bit (LSB) of the preset number, i.e., C1. The gate of transistor N2 is coupled to the output terminal of exclusive OR gate 81 having input terminals connected for receiving the "sign" bit (U), i.e., U/D in the figure and the LSB C1 respectively. As such the condition for N2 to conduct is defined by $$N2_{on} = \overline{U}C1 + U\overline{C1} \qquad (3)$$

The condition for connection 91 to go low is therefore described by:

$$91_{low} = C(\overline{U}C1 + U\overline{C1}) \qquad (4)$$

and $$91_{high} = \overline{C} + \overline{UC1} + UC1 \qquad (5)$$

Using equations (4) and (5) the output state C20 of terminal C20 can be defined by $$C20 \uparrow = C2\overline{UC1} + \overline{C2}C\overline{U}C1 + C2\overline{C} \qquad (6)$$

and $$C20 \downarrow = C2UC1 + \overline{C2}CU\overline{C1} + C2\overline{C} \qquad (7)$$

where C20 ↑ and C20 ↓ are the output states for the count up and count down modes respectively. Again it will be noted that if the count signal is low the preset value C2 is translated unchanged to the output terminal C20.

Similarly the output state at terminal C30 is dependent upon the preset state C3 and the conduction states of transistors N1, N2 and N3. C40 is similarly dependent on the preset state C4 and the conduction state of transistors N1, N2, N3 and N4. The Boolean equations defining C30 and C40 are given by:

$$C30 \uparrow = \overline{C3}C\overline{U}C1C2 + C3\overline{U}(\overline{C1} + \overline{C2}) + C3\overline{C} \qquad (8)$$

$$C30 \downarrow = \overline{C3}CU\overline{C1C2} + C3U(C1 + C1) + C3\overline{C} \qquad (9)$$

$$C40 \uparrow = \overline{C4}C\overline{U}C1C2C3 + C4\overline{U}(\overline{C1} + \overline{C2} + \overline{C3}) + C4\overline{C} \qquad (10)$$

$$C40 \downarrow = \overline{C4}CU\overline{C1C2C3} + C4U(C1 + C2 + C3) + C4\overline{C} \qquad (11)$$

where the arrows ↑ ↓ respectively denote counting in the up or down mode as determined by the state of the "sign" bit U.

FIG. 3 is a state table for the circuit of FIG. 2 generated from equations (2), (6), (7), (8), (9), (10), and (11). Columns C, C1–C4, depict all possible states of the count signal and the preset values respectively. The four rightmost columns C10–C40 indicate the resultant output states at terminals C10–C40 for the up/down or "sign bit" U being high or in the count down mode and the center four columns designated C40–C10 are the output states for the "sign bit" being low or in the count up mode. From the table it becomes apparent that when the count signal C is low, the circuitry between the preset terminals, C1–C4, and the output terminal, C10–C40 is transparent i.e. the signals C1, C2, etc. are translated unchanged to the output terminals C10, C20, etc. On the other hand when the count signal C is high the circuit performs an increment or decrement to the preset value depending on the "sign" bit U being low or high respectively. Note in two's complement notation, the "sign" bit of a positive or negative number is low and high respectively.

A word of clarification is in order at this point. Those skilled in the art of two's complement arithmetic will realize that an overflow or "carry out" for a negative number is a logic "zero" while the carry out for a positive number is a logic "one". The table in FIG. 3 presumes that the carry bit or count signal C is a logic "one" for both positive and negative overflows. This condition is easily obtained by the circuit shown in FIG. 4B which may be included as part of the COUNTER circuit or incorporated in the respective ADDER circuits.

Figure 4A:
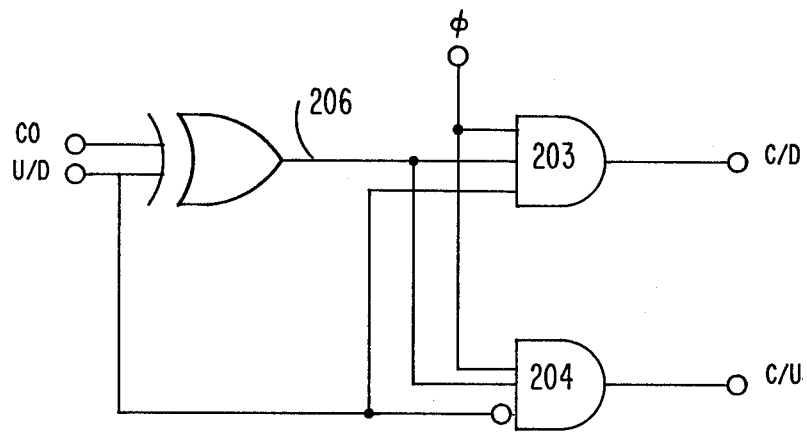
FIGS. 4A and 4B are schematic diagrams of logic circuitry for generating positive overflow signals for both positive and negative two's complement ADDER circuitry, and circuitry for generating count up and count down clock pulses responsive to positive and negative ADDER circuit overflow signals respectively.
Figure 4B:
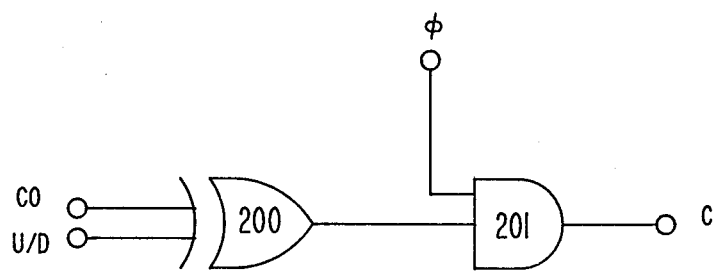

In FIG. 4B the carry out signal C0 ("1" for a positive number and "0" for a negative number) from a conventional ADDER circuit is applied to one input of exclusive OR circuit 200. The "sign" bit signal U/D is applied to the second input terminal of exclusive OR circuit 200. The output signal from exclusive OR circuit 200 is a "1" when C0 is low and U/D high to indicate a carry out for a negative number and is also a "1" when C0 is high and U/D is low to indicate a carry out for a positive number to satisfy the criteria of the state table. The output signal from exclusive OR gate 202 is ANDED with the system clock φ in AND circuit 201 to synchronize the count signal C so that transistor N1 will not conduct when the precharging transistors P1–P4 are conducting.

The count up C/U and count down C/D signals referred to with respect to FIG. 1 may be similarly generated by the circuit illustrated in FIG. 4A.

In FIG. 4A the carry out signal, C0, and sign bit signal U/D from a conventional ADDER circuit are applied to the input terminals of exclusive OR gate 205 producing a signal at connection 206 which is positive, i.e., a "1" for positive or negative overflows is applied to respective first input terminals of AND gates 203 and 204. The "sign" signal U/D is applied to a second input terminal of AND gate 203 and to an inverting input terminal of AND gate 204. The system clock φ is applied to respective third terminals of AND gates 203 and 204 to synchronize the C/D and C/U signals with the remaining filter circuitry. Following the conventional rules of combinatorial logic AND 203 will generate a "1" at its output terminal C/D for U/D "high", φ "high" and C0 "low" and a "zero" state otherwise. AND gate 204 will generate a "1" at its output terminal C/U for U/D "low", C0 "high" and φ "high". Thus, the circuit produces positive pulses, C/D, for negative overflows and produces positive pulses, C/U, for positive overflows.

Figure 5:
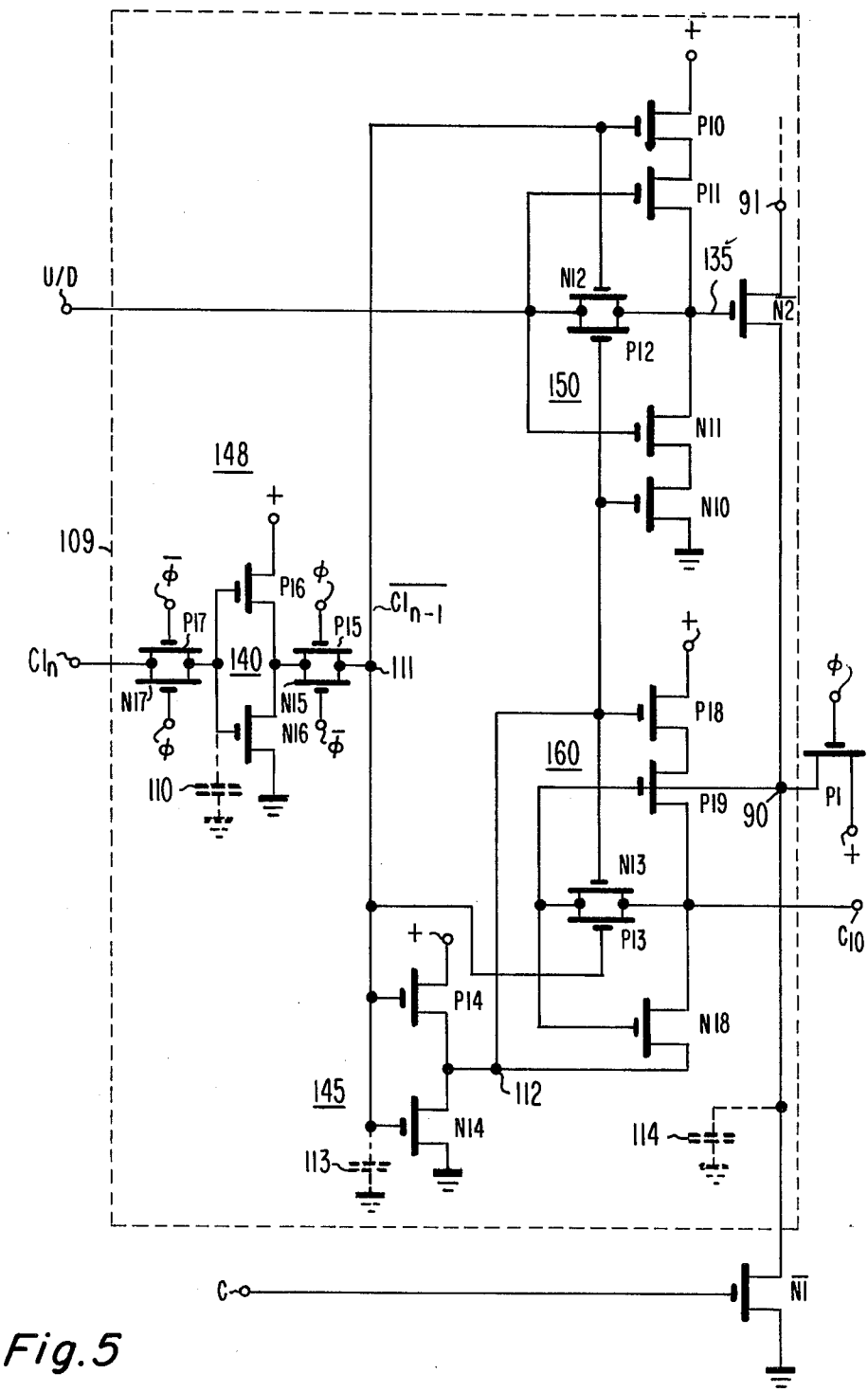
FIG. 5 is a schematic diagram of a further embodiment of the COUNTER CIRCUIT.

The circuit shown in FIG. 5 is a portion of the FIG. 2 COUNTER realized in MOS technology. FIG. 5 circuit elements bearing the same designation characters as the FIG. 2 circuit are the same or functionally similar. The FIG. 5 circuit includes the logic required to develop the least significant count bit C/O and the carry for the next significant bit i.e., the logic including exclusive OR gates 80 and 81. Additional bit positions are added to the counter by reproducing the FIG. 5 circuitry in substantially parallel fashion. For purposes of describing the invention, the COUNTER subcircuit circumscribed by the box 109 will be defined as the LOGIC unit and includes the LATCH circuit (60, 70, 67) the INVERTER (76), exclusive OR gates (81, 80) and the series transistor (N2) having an input connection (90) which is essentially a carry-in derived count, control transistor (N1), and an output node (91) to the next significant bit position which is essentially a "carry out" terminal from the LOGIC UNIT.

Referring to FIG. 5, the LOGIC UNIT is realized in complementary field effect transistor (FET) technology. Transistors designated Pi are P-type devices and those designated Ni are N-type devices. The two exclusive OR gates 150 and 160 of the LOGIC UNIT essentially share transistors in order to reduce overall device count. Pairs of transistors (N12, P12), (N13, P13), (N15, P15) and (N17, P17) are respective conventional MOS transmission gates with both transistors of each pair simultaneously conditioned to be conducting or non-conducting. As such it is possible to eliminate one transistor from each pair to further reduce device count. The capacitors 110, 113 and 114 drawn in phantom lines are inherent stray capacitances but where long-time constants are required, include capacitors added by design. Transistors N16 and P16 and transistors N14 and P14 having the respective drain-source electrodes serially connected and their respective gate electrodes interconnected are conventional INVERTER circuits 140 and 145 which logically invert (complement) logic signals applied to their gate electrodes. With the foregoing as background, the operation of the FIG. 5 circuit will be described.

The LATCH circuit 148 includes the transmission gates comprised of transistors N17, P17 and transistors N15, P15 and the INVERTER buffer 140 comprised of transistors N16, P16. Operation of the LATCH was described with respect to FIG. 2. It will be recognized that the LATCH complements the logic state at the preset terminal C1. The LATCH may alternatively incorporate a non inverting buffer with the consequence that the exclusive OR circuits 150 and 160 be interchanged. In this instance the respective output terminals C10 and 135 of exclusive OR gates 160 and 150 are to be interchanged and the U/D input of exclusive OR gate 150 will be interchanged with the input connection 90 to exclusive OR gate 160. The use of the INVERTER buffer however is generally more desirable because it employs fewer transistors than a non inverting buffer.

The LATCH output signal is available at connection 111. This signal is applied to the gate electrode of transistor P10 which is connected in series with transistors P11, N11 and N10. The LATCH 148 output signal is also applied to the gate electrode of transistor N12 connected as a transmission gate between the U/D input terminal and the output terminal 135 of exclusive OR gate 150. Because transistors P10 and N12 are complementary they are conditioned to conduct in the alternative. The LATCH 148 output signal is also applied to the gate electrodes of transistors N14 and P14 arranged as an INVERTER 145 which produces the complement of this signal at its output connection 112. The output signal of INVERTER 145 is applied to the gate electrodes of the series transistor N10 and the transmission gate P12 of exclusive OR gate 150. Since complementary signals are applied to serially connected complementary transistors P10 and N10 they simultaneously conduct when the LATCH output signal is in the low state. The transmission gate (N12, P12) on the other hand is conditioned to conduct when the LATCH output is high.

The second input terminal, U/D, of exclusive OR 150 is directly connected to the gate electrodes of the serially connected transistors P11 and N11. Since transistors P11 and N11 are complementary types they are conditioned to conduct in the alternative responsive to the potential applied to the U/D terminal. P11 conducts when U/D is low and N11 conducts for U/D high. Consider the LATCH output and U/D state both to be low. N11, N12 and P12 are held off isolating connection 135 from terminal U/D and ground. Transistors P10 and P11 however, are conditioned to conduct applying positive supply potential to connection 135 and producing a high output state. Next consider U/D high and the LATCH output high. Transistors P10 and N10 are held off isolating connection 135 from ground and supply potentials. Transistors N12 and P12 however are conditioned to conduct applying the high potential at terminal U/D directly to connection 135. On the other hand if U/D were low, a low potential would be applied to connection 135. The last remaining possible input state is for U/D high and the LATCH output low. In this state transistors N12, P12 and P11 are off isolating output connection 135 from terminal U/D and positive supply potential. Transistors N11 and N10 are conditioned to conduct applying ground potential or a logic low state.

Summarizing, the output state of connection 135 is high for LATCH and U/D both high or both low and is low for LATCH and U/D different, which state relationship defines the conventional exclusive NOR function. Taking into consideration that the LATCH circuit complements the logic signal applied to terminal C1, with respect to logic levels applied to terminal C1, gate 150 in fact performs the exclusive OR function.

The circuit 160 operates in a similar manner. In this circuit however, transistor N14 serves as a pull-down device for INVERTER 145 and as a serially connected transistor with transistors N13, P13 and P18. For purposes of analysis, transistor N14 may be conceptually partitioned into two separate transistors—one on which is included in the INVERTER circuit 145, the other in the circuit 160. With this conceptualization, it will be recognized that circuit 160 is similar to circuit 150 and therefore operates logically similarly thereto. However, subsumming the two conceptualized transistors into a single device, N14, provides the advantage of reducing the number of devices in the circuit.

What is claimed is:

1. Incrementing/decrementing circuitry for receiving a binary number and selectively incrementing or decrementing said number comprising:

M input terminals for applying respective bits of said binary number where M is an integer;

M output terminals, one each of which is associated with respective ones of said M input terminals;

first and second control terminals for applying first and second logic control signals, said first control signal conditioning said circuitry to perform an increment/decrement operation and said second control signal determining if the operation will be an increment or a decrement;

M LOGIC UNITS each having respective carry in terminals and respective carry out terminals;

means connecting the first control terminal to the carry in terminal of a first of said M LOGIC UNITS;

respective means serially connecting the carry out terminals of the first to (M-1)th LOGIC UNITS to the respective carry in terminals of the second to the Mth LOGIC UNITS respectively;

respective means for selectively precharging the carry in terminals of the M LOGIC UNITS;

and wherein each LOGIC UNIT further includes;

a. a first combinatorial logic circuit having a first input terminal connected to the carry in terminal, a second input terminal connected to one of said M input terminals and an output terminal connected to one of said M output terminals, the output function of which is characterized by the exclusive NOR operation on input signals at the carry in terminal and at said one of said M input terminals;

b. a transistor having a principal conduction path connected between the carry in and carry out terminals and having a control electrode; and c. a second combinatorial logic circuit having a first input terminal connected to said second control terminal, a second input terminal connected to said one of said M input terminals, and an output terminal connected to the control electrode of said transistor, the output function of said second logic circuit being characterized by the exclusive OR operation on input signals at the second control terminal and said one of said M input terminals.

2. The incrementing/decrementing circuit set forth in claim 1 further including a storage element having an input terminal connected to said one of said M input terminals and an output terminal connected to the second input terminals of said first and second combinatorial logic circuits.

3. The incrementing/decrementing circuitry set forth in claim 1 wherein the means connecting the first control terminal to the carry in terminal of said LOGIC UNIT comprises a further transistor having a principal conduction path connected between said carry in terminal and a point of reference potential and having a control electrode connected to said first terminal.

4. The incrementing/decrementing circuitry set forth in claim 2 or 3 wherein said storage elements each comprise:

an INVERTER circuit having input and output terminals;

a first transmission gate responsive to a first clocking signal for selectively serially connecting the INVERTER input terminal to said one of said M input terminals; and a second transmission gate responsive to a further clocking signal for selectively connecting the INVERTER output terminal to the second input terminals of said first and second combinatorial logic circuits.

5. The incrementing/decrementing circuitry set forth in claim 1 or 2 or 3 wherein the first combinatorial logic circuit comprises a two-input exclusive OR gate.

6. The incrementing/decrementing circuit set forth in claim 1 or 2 or 3 wherein the second combinatorial logic circuit comprises:

an INVERTER circuit having an input terminal connected to the second input terminal of said second combinatorial logic circuit and having an output terminal; and a two-input exclusive OR circuit having a first input terminal connected to the output terminal of said INVERTER circuit and a second input terminal connected to said second control terminal.

7. The incrementing/decrementing circuitry set forth in claim 6 wherein the second combinatorial logic circuit comprises an exclusive NOR gate having a first input terminal connected to said second control terminal, and a second input terminal connected to an output terminal of said storage element.

8. The incrementing/decrementing circuitry set forth in claim 2 or 3 wherein said first and second combinatorial logic circuits comprise:

first and second transmission gates having respective control electrodes and respective input and output electrodes defining selectively controlled conduction paths;

first, second, third, fourth and fifth FET's of a first conductivity type having respective control electrodes and respective first and second electrodes defining respective principal conduction paths;

sixth, seventh, eighth and ninth FET's complementary to said first conductivity type having respective control electrodes and respective first and second electrodes defining respective principal conduction paths;

means serially connecting the principal conduction paths of the first and second FET's between a supply potential and a first node at the output of the second combinatorial logic circuit and serially connecting the principal conduction paths of the sixth and seventh FET's between said first node and said reference potential and wherein the gate electrodes of the first and sixth FET's are connected to said second control terminal, the gate electrode of the second FET is connected to the storage element output terminal and the gate electrode of the seventh FET is connected to a second node;

means for connecting the input and output terminals of the first transmission gate between said first node and said second control terminal and the control terminal of the first transmission gate to one of said first node and the storage element output terminal;

means for serially connecting the principal conduction paths of the third and fourth FET's between said supply potential and said one of said M output terminals and for serially connecting the principal conduction paths of said eighth and ninth FET's between said one of said M output terminals and said reference potential and wherein the control electrodes of the third and eighth FET's are connected to said carry in terminal, and the control electrodes of the fourth and ninth FET's are respectively connected to said second node and the storage element output terminal;

means for connecting the input and output electrodes of the second transmission gate between the carry in terminal and said one of said M output terminals and the control terminal thereof to one of said second node and the storage element output terminal;

means for serially connecting the principal conduction path of the fifth FET between said supply potential and an interconnection of the principal conduction paths of said eighth and ninth FET's, the control electrode of said fifth FET being connected to the storage element output terminal; and means for connecting the second node to said interconnection of the eighth and ninth transistors.

* * * * *